July 18, 1967     G. ROMER     3,331,417
ROTOR ASSEMBLY FOR ENSILAGE CUTTER OR THE LIKE
Filed March 8, 1965     3 Sheets-Sheet 1

July 18, 1967  G. ROMER  3,331,417
ROTOR ASSEMBLY FOR ENSILAGE CUTTER OR THE LIKE
Filed March 8, 1965  3 Sheets-Sheet 2

July 18, 1967  G. ROMER  3,331,417
ROTOR ASSEMBLY FOR ENSILAGE CUTTER OR THE LIKE
Filed March 8, 1965  3 Sheets-Sheet 3

United States Patent Office 3,331,417
Patented July 18, 1967

3,331,417
ROTOR ASSEMBLY FOR ENSILAGE
CUTTER OR THE LIKE
Gerhard Romer, Alstadt, near Homburg, Germany,
assignor to Deere & Company, Moline, Ill., a corporation of Delaware
Filed Mar. 8, 1965, Ser. No. 437,982
Claims priority, application Germany, Mar. 28, 1964,
D 44,033
14 Claims. (Cl. 146—117)

ABSTRACT OF THE DISCLOSURE

A rotary, reel-type cutter head for an ensilage cutter or the like having a plurality of longitudinally extending knives at its outer periphery and means for shifting one or more of the knives to inoperative positions without changing the cutter head's center of gravity.

This invention relates to a cylindrical type rotor for an ensilage cutter or the like and more particularly to a cylindrical type rotor having knives which are shiftable to and from an inoperative position.

A conventional ensilarge cutter has a rotary type cutter head which runs at a relatively constant speed. To change the length of the cut of the harvested material, either the rate at which the material is fed into the rotor must be changed or the number of knives on the rotor must be varied. The first method of changing the length of cut is conventionally accomplished by changing the drive ratios for the feed rolls. However, reducing the length of cut by this method necessarily reduces the output of the machine.

If the rotor is of the disk type, with radial knife edges, the number of knives can be changed by axially retracting the knives to an inoperative position. However, in a cylindrical type of rotor having longitudinal knives at the periphery of the cylinder, retracting a knife would shift the center of gravity of the rotor and the resulting imbalance could destroy the machine. The number of knives could also be varied by removing a pair of knives from opposite sides of the rotor without shifting the rotor center of gravity. However, this method is laborious and time-consuming and requires adjustment of the knives when they are reinstalled to obtain accurate register of the knives with the stationary knife.

According to the present invention, the knives are adjustable on the rotor between operative and inoperative positions without shifting the center of gravity of the rotor.

Thus, the primary object of the invention is to provide a cylindrical type cutter head with means for varying the effective cutting edges to vary the length of material cut in an ensilage cutter or the like.

A more specific object is to vary said effective cutting edges by shifting the knives on the rotor between operative and inoperative positions without changing the center of gravity of the rotor.

A further object is to provide such a variation in effective cutting edges by axially shifting the knives on the rotor relative to the material inlet so that only alternate knives cut the material moving through the inlet.

Another object of the invention is to provide a rotor in which the knives are swingably mounted on the rotor about their center of gravity so that the knives can be swung to and from their operating position without changing the center of gravity of the rotor.

Another object is to provide means for selectively locking such swingable knives in either an operative or inoperative position.

Still another object of the invention is to provide a rotor having a number of fixed equally spaced knives and a number of equally spaced knives retractable in unison to an inoperative position without changing the center of gravity of the rotor.

These and other objects of the invention will become apparent from a consideration of the following detailed description and accompanying drawings wherein.

Figure 1:
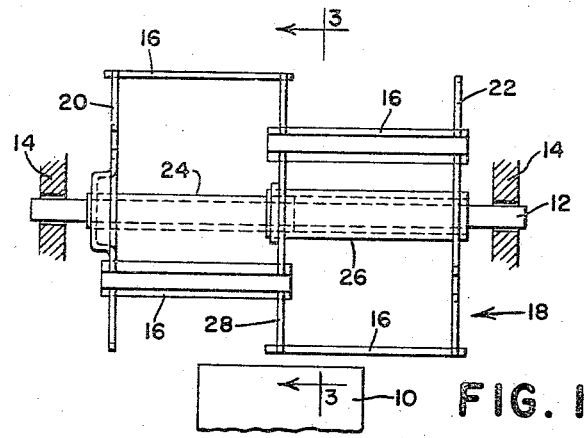
FIG. 1 is a schematic plan view of one embodiment of the invention with the rotor knives positioned for a longer cut of the material.
Figure 2:
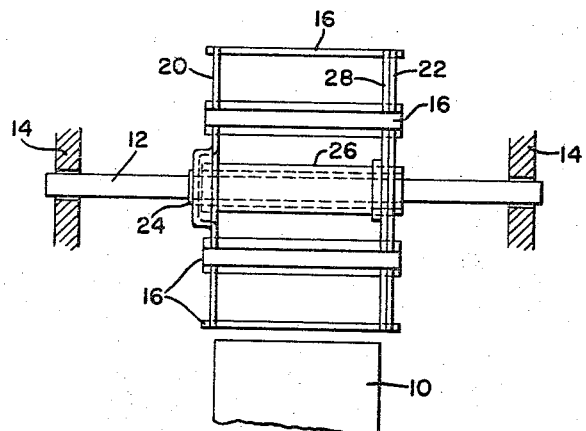
FIG. 2 is a view similar to FIG. 1 showing the knives positioned for a shorter cut of material.
Figure 3:
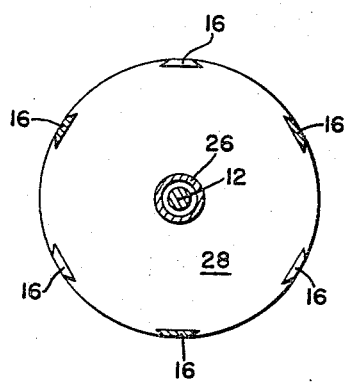
FIG. 3 is a section view taken along the line 3—3 of FIG. 1.

Referring now to the drawings and in particular to FIGS. 1, 2, and 3, there is shown a cutter head or rotor having an associated material inlet 10. The rotor comprises an axial shaft 12 journaled at opposite ends in bearings 14 conventionally supported on the main frame of the machine. A plurality of longitudinally extending knives 16 are mounted on the shaft for rotation therewith at the periphery of the rotor via knife mounting means indicated generally by the numeral 18.

The knife mounting means 18 includes a pair of axially spaced, radially extending support members 20 and 22 respectively, which are mounted on the shaft for rotation therewith, and axially slidable thereon. The support members 20 and 22. A radial support means 28 is axially member 22 includes a hub portion 26 within which the hub portion 24 telescopes. The radial support members 20 and 22 are disk-shaped, and the knives 16, which are equally spaced around the periphery of the rotor, are alternately affixed to the outer periphery of the support members 20 and 22. A radial support means 28 is axially slidably mounted on the hub portion 26 between the radial support members 20 and 22. Each knife 16 is also carried by the outer periphery of the radial support means 28. The alternate knives which are affixed to the support member 22 are axially slidable along the radial support means 28.

The knives 16 are approximately the same length as the axial dimension of the material inlet 10. When the rotor is positioned for a shorter material cut, as shown in FIG. 2, the radial support members 20 and 22 are converged so that each knife 16 has the same cutting path opposite the material inlet 10. In this position the hub portion 24 telescopes within the hub portion 26, and the radial support means 28 slides along the outer surface of the hub portion 26 to a position adjacent the support member 22.

To increase the length of the cut, the radial support members 20 and 22 are diverged to the position shown in FIG. 1. In this position the alternate knives 16 have approximately adjacent cutting paths with each cutting path extending only approximately one-half the width of the material inlet. Thus, as the material moves through the material inlet, it is only cut by every other knife resulting in a longer cut.

While the rotor is shown in the drawings to have six knives 16, any even number of knives such as four, six, or eight, etc. could be mounted in a similar manner with alternating knives being mounted on opposite support members 20 and 22.

Figure 4:
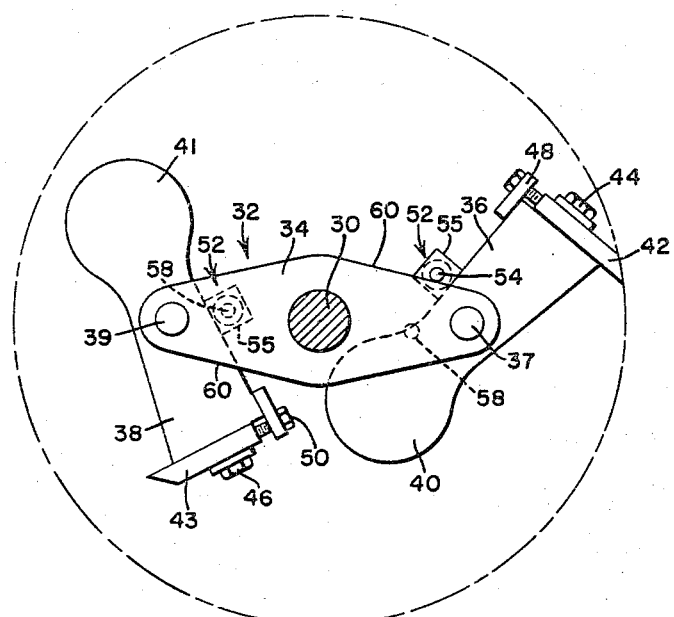
FIG. 4 is an end view of a second embodiment of the invention with one knife locked in an operative position and a second knife locked in an inoperative position.
Figure 5:
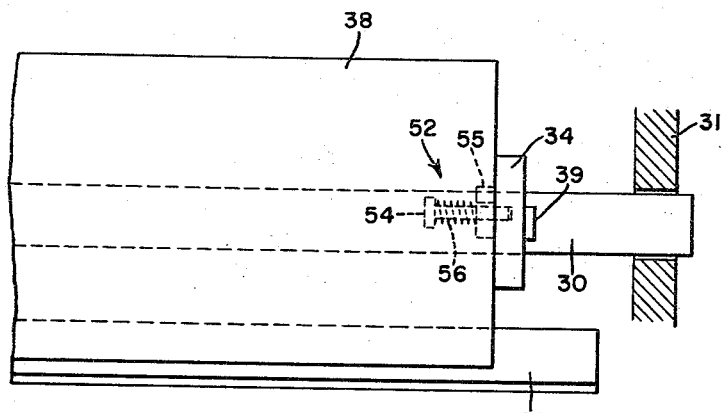
FIG. 5 is a plan view of one end of the rotor shown in FIG. 4.

In a second embodiment of the invention shown in FIGS. 4 and 5, there is shown a rotor comprising an axial shaft 30 journaled at opposite ends in bearings 31 conventionally carried by the main frame of the machine. A knife mounting means 32 is carried by the shaft and includes a pair of axially spaced radial support members 34 affixed to opposite ends of the shaft 30. In the drawings, only one end of the rotor is shown, and consequently only one radial support member 34 is shown, although it can be appreciated that the other end of the rotor is identical to the end shown. A knife holder 36 is pivotally mounted between the radial support members 34 on a shaft 37 carried by the support members and parallel to and radially offset from the shaft 30. An identical knife holder 38 is pivotally mounted between the radial support members 34 on a shaft 39 carried by the support members and parallel to and radially offset from the shaft 30 in the opposite direction from the shaft 37.

While the rotor shown has only two knife holders, it is to be understood that the invention is not limited to such a rotor, for any plurality of similarity mounted knife holders could be utilized as long as the shafts on which they are mounted are equally offset from the rotor axis and are equally spaced around the rotor circumference.

The knife holder 36 carries a knife 42, which is attached at one end of the knife holder by a fastener 44. The knife holder 36 also includes a counterweight portion 40, which balances the knife holder 36 and the knife 42 about the shaft 37. The knife holder 38 similarly carries a knife 43 which is attached at one end of the knife holder via a fastener 46, and also includes a counterweight portion 41 which balances the knife holder 38 and the knife 43 about the shaft 39. The radial distance of the knives 42 and 43 from the shafts 37 and 39 respectively is variable via respective adjusting means 48 and 50, to obtain an accurate register of the knives relative to a conventional stationary knife (not shown).

The knife holders 36 and 38 and the knives 42 and 43 carried thereby are swingable about their respective shafts 37 and 39 between an operative position wherein the knife rotates at the periphery of the rotor, and an inoperative position wherein the knife is rotating at a lesser radius than the periphery of the rotor. In FIG. 4, the knife holder 36 is shown in the operative position and the knife holder 38 is shown in the inoperative position. The knife holders are maintained in either position by a locking means 52, here shown as a pin 54 axially slidable in a bracket mounted on each knife holder and biased toward the radial support member 34 by a tension spring 56. A bore 58 in the support member 34 receives the pin 54 when the knife holder is in the inoperative position to maintain the knife holder in said position. The pin 54 engages an edge 60 of the radial support member to maintain the knife holder in the operative position.

In operation, to obtain a minimum length material cut, each knife holder is placed in its operative position with the knife carried thereby rotating at the periphery of the rotor. To increase the length of the cut, one or more of the knife holders and knives carried thereby are retracted to an inoperative position by pulling the pin 54 against the bias of the spring 56 to release the locking means 52 and then swinging the knife holder about its mounting shaft until the pin 54 falls into the bore 58. Since the knife holder and the components carried thereby are balanced and mounted about its center of gravity, the swinging motion does not affect the center of gravity of the rotor.

Figure 6:
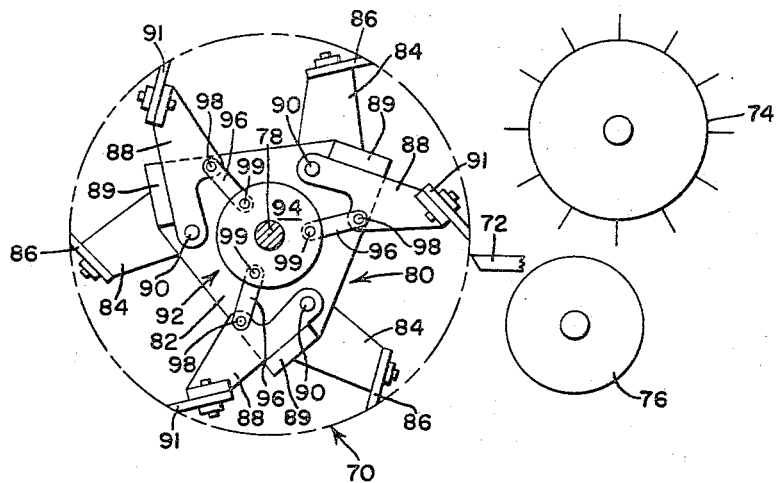
FIG. 6 is an end view of a third embodiment of the invention with the knives positioned for a short material cut.
Figure 7:
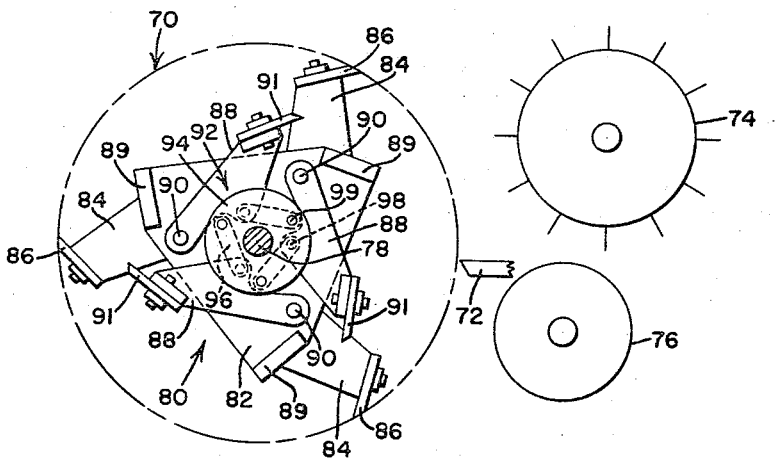
FIG. 7 is a view similar to FIG. 6 with the knives positioned for a longer cut of material.

In FIGS. 6 and 7, a third embodiment of the invention is shown which includes a rotor 70, having an associated stationary knife 72, and a pair of feed rolls 74 and 76 between which the material is radially fed to the rotor. The rotor 70 includes an axial shaft 78 which carries a knife mounting means, indicated generally by the numeral 80. The knife mounting means comprises a pair of axially spaced radial support members 82 affixed to the shaft at opposite ends of the rotor and a plurality of fixed knife holders 84 mounted on and extending radially from the support members at equal intervals around the rotor. A longitudinally extending fixed knife 86 is affixed to each fixed knife holder at the outer periphery of the rotor. The knife mounting means 80 also includes a like number of movable knife holders 88 pivotally carried by the support members via shafts 90, which are radially offset from and parallel to the rotor shaft 78 at equal intervals about the rotor shaft. A movable knife 91 is affixed to each movable knife holder and is shiftable therewith between a first position, in which each movable knife also rotates at the periphery of the rotor as shown in FIG. 6, and a second position, wherein each movable knife is retracted from the rotor periphery to an inoperative position as shown in FIG. 7. The movable knife holders 88 engage stop means 89, which project from the support members 82 into the path of each movable knife holder, to limit the outward movement of the movable knives and establish the first position.

Each movable knife holder 88 is interconnected for movement in unison between its alternate positions by a control means 92, which includes a disk-like control member 94 rotatably mounted on the shaft 78 adjacent each support member 82. The control means also includes a control linkage 96 pivotally mounted to each movable knife holder 88 via a shaft 98 which is parallel to and radially offset from the shaft 90. The other end of each linkage 96 is pivotally attached to the control member 94 via a shaft 100 which is parallel to and offset from the shaft 78.

When the control member 94 is rotated relative to the shaft to a point wherein the movable knife holders 88 engage the stop means 49, each movable knife holder 88 is positioned with its knife 91 in an operative position at the outer periphery of the rotor, for a minimum length material cut. To double the length of material cut, the control member 94 is rotated relative to the shaft 78, whereby the movable knife holders 88 are retracted through the linkages 96 to the inoperative position shown in FIG. 7. Since the movable knife holders 88 are equally spaced around the rotor and are shifted in unison, the shifting movement does not change the center of gravity of the rotor. The position of the control member 94 is manually established and maintained by a locking means (not shown). It is also possible that the shifting movement of the control means be remotely controlled so that the length of material cut can be easily varied without opening the machine.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. A rotor for a cylindrical type rotary cutter of the class described comprising: an axial shaft; a knife mounting means carried by said shaft; a plurality of longitudinally extending knives carried by said mounting means, said mounting means being selectively shiftable between a first position wherein said knives are located in an operative position at the periphery of the rotor and a second position wherein at least one of said knives is located in at least a partially inoperative position; and means for maintaining the mounting means in the selected position.

2. The invention defined in claim 1 wherein the rotor is balanced about its axis in both positions of the mounting means.

3. The invention defined in claim 2 wherein the mounting means includes a pair of radial support members mounted on said shaft for axial shifting movement relative thereto to establish said first and second mounting means positions, and an even number of longitudinally extending parallel knives are carried by the mounting means at equal intervals around the periphery of the rotor with alternate knives being affixed to alternate support members, said knives having substantially the same cutting path in the first position in which each knife is operatively positioned to cut material along its length, said knives and said support members diverging axially to said second position wherein the alternate knives have substantially adjacent cutting paths in which a portion of each knife is in an inoperative position.

4. The invention defined in claim 2 wherein the mounting means includes radially extending support members attached to said shaft and a plurality of knife holders carried by said support members, each knife holder carrying a longitudinally extending knife, at least one of said knife holders being mounted on said support member for rocking movement about an axis parallel to and spaced from said shaft axis between alternate positions to establish the first and second positions of said mounting means, each knife mounted on a rockable knife holder being located in an operative position on the periphery of the rotor in said first position and in an inoperative position at a lesser radius than the periphery of the rotor in said second position.

5. The invention defined in claim 4 wherein each rockable knife holder and knife mounted thereon are balanced about the axis of rocking movement.

6. The invention defined in claim 2 wherein the mounting means includes radially extending support members mounted on the shaft, and a plurality of fixed knife holders mounted on said support members, each fixed knife holder carrying a longitudinally extending parallel knife at the periphery of the rotor, said knife holders and knives being equally spaced around said rotor, the mounting means also including a number of equally spaced movable knife holders, each movable knife holder carrying a knife parallel to the fixed knives and being rockably mounted between alternate positions to establish said first and second positions, the mounting means also including control means operably connected to said movable knife holders for establishing the position of said knife holders.

7. In an ensilage cutter or the like having a material inlet, a rotor for a cylindrical type rotary cutter associated with said inlet in a generally radial direction and comprising: an axial shaft having a greater axial length than said inlet; a pair of axially spaced, radially extending support members mounted on said shaft for axial movement only between first and second positions; an even number of longitudinally extending parallel knives carried by said support members at equal intervals around the periphery of the rotor with alternate knives being affixed to alternate support members, said knives having approximately the same axial dimension as said material inlet and having the same cutting path in the first position associated with the inlet throughout its length, said support members and their respective knives diverging axially to the second position wherein the alternate knives form substantially adjacent cutting paths wherein the remote approximate halves of said knives are in an inoperative position relative to the inlet.

8. The invention defined in claim 7 wherein the knives are affixed to the respective support members proximate their remote ends in said second position, and the opposite end of each knife is slidably supported by the opposite support member in the first position.

9. The invention defined in claim 8 and including radial support means mounted on said shaft intermediate said support members, and operably connected to said knives in said second position for radially supporting said knives.

10. A rotor for a cylindrical type rotary cutter comprising: an axial shaft, a plurality of radial support members mounted on said shaft for rotation therewith, a plurality of knife holders pivotally mounted on said support members at equal circumferential intervals for rocking movement between first and second positions about an axis parallel to and radially offset from the rotor axis, a longitudinally extending knife mounted on each knife holder, each knife being parallel and located in an operative position at the rotor periphery in said first position, and retracted to an inoperative position in said second position; and locking means operative between each rockable knife holder and a support means for maintaining the knife holder in the selected position.

11. The invention defined in claim 10 wherein the axis of rocking movement of said knife holders extends through the center of gravity of the knife holder and the knives mounted thereon.

12. A rotor for a cylindrical type rotary cutter comprising: an axial shaft; a pair of axially spaced, radially extending support members mounted on said shaft for rotation therewith; a plurality of knife holders pivotally mounted between said support members at equal circumferential intervals for rocking movement about axes parallel to and equally offset radially from the rotor axis between first and second positions; a longitudinally extending knife mounted on each knife holder; locking means operably interconnecting each knife holder with said support members for maintaining the knife holders in the first or second position; a longitudinally extending knife mounted on each knife holder; locking means operably interconnecting each knife holder with said support members for maintaining the knife holder in the first or second position, each knife holder and the knife mounted thereon being balanced about the axis of rotation of the knife holder, and each knife being located in an operative position at the periphery of the rotor in the first position and retracted to an inoperative position in the second position.

13. A rotor for a cylindrical type rotary cutter comprising: an axial shaft; a plurality of support members mounted on the shaft for rotation therewith; a plurality of generally radially extending fixed knife holders carried by said support members at equal circumferential intervals; a longitudinally extending fixed knife mounted on each fixed knife holder and positioned on the periphery of the rotor; a like number of movable knife holders pivotally mounted at equal circumferential intervals on said support members for rocking movement between first and second positions about axes parallel to and radially offset from the rotor axis; a longitudinally extending knife mounted on each movable knife holder and located in operating position on the periphery of the rotor parallel to and between fixed knives when the movable knife holders are in the first position, said movable knives being located in an inoperative position when the movable knife holders are in the second position; and control means operably connected to the movable knife holders for establishing the position of said knife holders.

14. The invention defined in claim 13 wherein the control means includes at least one control member rotatably mounted on said shaft and a plurality of linkages, a linkage being pivotally mounted at one end to each movable knife holder for rocking movement about an axis parallel to and offset from the knife holder pivot, the other end of each linkage being pivotally mounted on said control member for rocking movement about an axis parallel to and offset from the shaft axes, for shifting movement of the movable knife holders in unison in response to rotation of the control member on the shaft.

References Cited
UNITED STATES PATENTS
939,772 11/1909 Williams _____ 241—192
2,529,797 11/1950 Cauble.

WILLIAM W. DYER, Jr., *Primary Examiner.*

W. GRAYDON ABERCROMBIE, *Examiner.*